(12) United States Patent
Hsieh et al.

(10) Patent No.: US 9,069,544 B2
(45) Date of Patent: Jun. 30, 2015

(54) UNINTERRUPTIBLE POWER SUPPLY AND METHOD FOR CONTROLLING POWER DISTRIBUTION UNIT BY THE SAME

(75) Inventors: Hung-Ming Hsieh, Taipei (TW); Hung-Chun Chien, Taipei (TW); Wen-Shuo Chuang, Taipei (TW); Yung-Hao Peng, Taipei (TW)

(73) Assignee: CYBER POWER SYSTEMS INC., Taipei (TW)

( * ) Notice: Subject to any disclaimer, the term of this patent is extended or adjusted under 35 U.S.C. 154(b) by 771 days.

(21) Appl. No.: 13/422,680

(22) Filed: Mar. 16, 2012

(65) Prior Publication Data

US 2013/0246814 A1 Sep. 19, 2013

(51) Int. Cl.
*H02J 7/00* (2006.01)
*H02J 9/00* (2006.01)
*G06F 1/30* (2006.01)

(52) U.S. Cl.
CPC .... *G06F 1/30* (2013.01); *H02J 9/00* (2013.01)

(58) Field of Classification Search
CPC .................................... H02J 9/00; G06F 1/30

USPC .......................................................... 307/64
See application file for complete search history.

(56) References Cited

U.S. PATENT DOCUMENTS

2005/0071699 A1* 3/2005 Hammond et al. ........... 713/300

* cited by examiner

*Primary Examiner* — Carlos Amaya
(74) *Attorney, Agent, or Firm* — WPAT, P.C.; Anthony King (57) ABSTRACT

A method for controlling power distribution unit (PDU) by an uninterruptible power supply (UPS) has steps of allowing logging in the UPS through a network, providing a web-based user interface and allowing adding an identification of at least one PDU to use sockets on the added PDU to simulate additional sockets on the UPS, performing a handshaking task with the added PDU, receiving information from the added PDU during performing of the handshaking task, displaying the received information of the added PDU on the web-based user interface and allowing either operating the UPS or controlling the added PDU. The method allows the UPS to be capable of communicating with all connected PDUs so the user can merely login the UPS to control and manage all PDUs connected to the UPS.

18 Claims, 6 Drawing Sheets

201 — Registered IP:192.168.10.178

200

202 — Name: Server A UPS
- 202A ● Reboot UPS
  - Shutdown Delay [▼]
  - Reboot Duration [▼]
- 202B ○ Shutdown UPS
  - Shutdown Delay [▼]

202C — 9/30A

[Next»] [Cancel]   IP Address 192.168.10.178

---

203 — Control Command [Turn On ▼] — 203A

Name   Server A PDU#1   203C — 6/20A

| State | # | Name |
|---|---|---|
| ☐ ON | 1 | Printer A |
| ☐ ON | 2 | Printer A |
| ☐ ON | 3 | Printer A |
| ☐ ON | 4 | Printer A |
| ☐ ON | 5 | Monitor A |
| ☐ ON | 6 | Monitor B |
| ☐ ON | 7 | Monitor C |
| ☐ ON | 8 | Monitor D |

203B / 203D

[Next»] [Cancel]   IP Address 192.168.24.25

---

Control Command [Turn On ▼]

Name   Server A PDU#2   3/15A

| State | # | Name |
|---|---|---|
| ☐ ON | 1 | RD PC#1 |
| ☐ ON | 2 | RD PC#2 |
| ☐ ON | 3 | RD PC#3 |
| ☐ ON | 4 | RD PC#4 |
| ☐ ON | 5 | PM PC#1 |
| ☐ ON | 6 | PM PC#2 |
| ☐ ON | 7 | PM PC#3 |
| ☐ ON | 8 | PM PC#4 |

[Next»] [Cancel]   IP Address 10.10.27.131

UNINTERRUPTIBLE POWER SUPPLY AND METHOD FOR CONTROLLING POWER DISTRIBUTION UNIT BY THE SAME

BACKGROUND OF THE INVENTION

1. Field of the Invention

The present invention relates to an uninterruptible power supply, and more particularly to an uninterruptible power supply and a method for controlling power distribution unit by the same.

2. Description of Related Art

The information technology industry utilizes computers or servers for managing and storing important data. In order to ensure that the stored data is well-preserved in the computers or the servers, uninterruptible power supplies (UPS) are used to provide an emergency power source for the computers or the servers when the mains power is unstable or fails. In addition to the information technology industry, other industries also use the UPS, and more and more equipments utilize the UPS as backup power sources.

Figure 6:
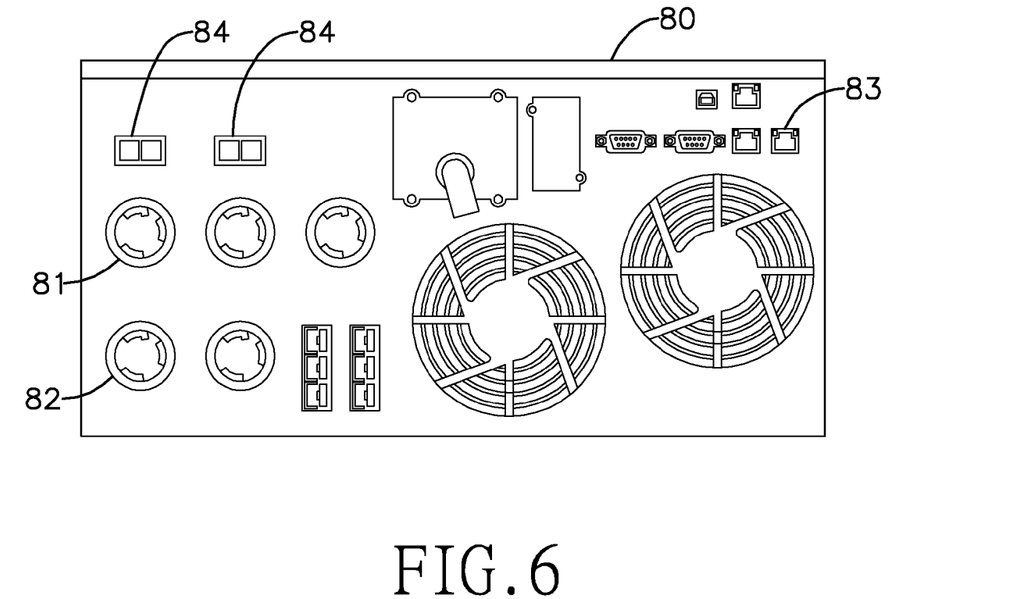
FIG. 6 is a rear view of a conventional UPS.

With reference to FIG. 6, a conventional UPS 80, which is 6000 volt-ampere (VA) rating, has multiple sockets 81, 82 and multiple network interfaces 83 disposed on a back plate of the UPS 80. The sockets 81, 82 are used to connect to multiple electrically-powered apparatuses and provide power thereto. Some sockets 81 have switches 84 for independently and correspondingly switching the sockets 81 on and off so the sockets 81 are able to be remotely controlled via network by controlling the switches 84. For example, five sockets 81, 82 are implemented on the conventional UPS.

Figure 7:
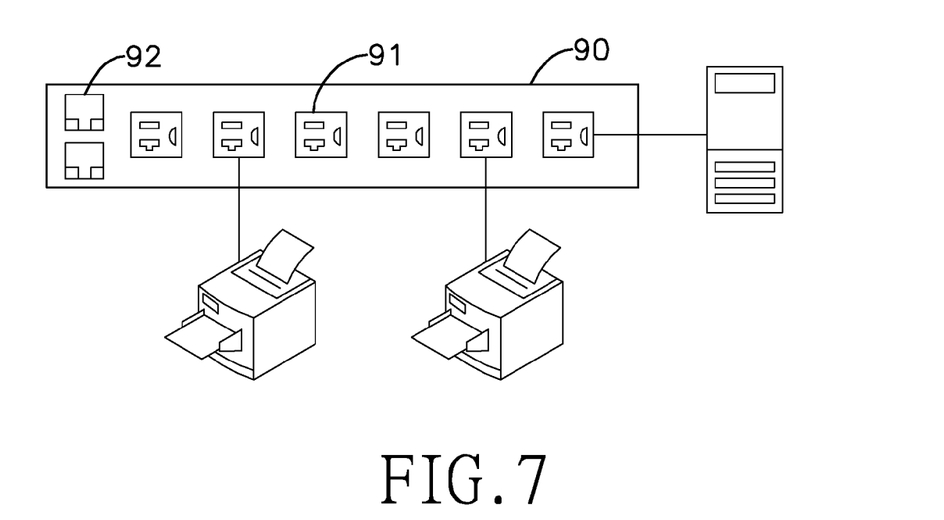
FIG. 7 is a functional block diagram showing that a conventional PDU connects to multiple electrically-powered apparatuses.

However, according to the constitution of the UPS, a single UPS is not able to supply power to various electrically-powered apparatuses. Therefore, a power distributor unit (PDU) is used to solve the above-mentioned shortcomings. With reference to FIG. 7, the conventional PDU 90 has multiple sockets 91 and at least one network interface 92 disposed thereon. The conventional PDU 90 connects to the sockets 81, 82 of the conventional UPS 80 via power lines and plugs to obtain power. The conventional PDU 90 provides more sockets 91 than the conventional UPS 80 does to provide power to more electrically-powered apparatuses. Further, the conventional PDU 90 can be connected via its network interface 92 so a user can remotely login the conventional PDU 90 through the network to check connection statuses between the conventional PDU 90 and the electrically-powered apparatuses and control whether the conventional PDU 90 is to provide power to the electrically-powered apparatuses or not.

In addition, the conventional UPS 80 merely provides part of its sockets 81 having independent switches 84 for controlling the sockets 81 to provide power or not. One solution is to use the PDU 90 and to connect the apparatuses to the UPS 80 through the PDU 90. The user can manage whether to provide power to the connected apparatuses by logging in and controlling the PDU 90. However, the conventional UPS 80 cannot provide information about the connection statuses of the PDU 90. If there are multiple PDUs 90 connected to the UPS 80, the user has to login each PDU 90 to control and manage the connection statuses of the PDU 90. It is inconvenient for the user to manage and control all apparatuses directly or indirectly connected to the UPS 80.

One solution for the above-mentioned shortcomings is to use a managing sever. A network manage station software is installed in the managing sever and provides functions on connecting to and controlling the PDUs 90. However, the conventional network manage station software, such as HP OpenView or IBM Tivoli, usually costs several tens or even hundreds of thousands of USD. It is too expensive for medium and small-sized enterprises to use the network manage station software. Also, the apparatuses such as production lines in the factory, fishery pumping system, watering system, or illumination system used in conventional industries may be difficult or may not be suitable to use a UPS 80 connecting to and controlled by a managing server.

To overcome the shortcomings, the present invention tends to provide an uninterruptible power supply and a method for controlling power distribution unit by the same to mitigate or obviate the aforementioned problems.

SUMMARY OF THE INVENTION

The main objective of the invention is to provide a method for controlling power distribution unit (PDU) by an uninterruptible power supply (UPS). The method comprises steps of allowing logging in the UPS through a network, providing a web-based user interface and allowing adding an identification of at least one PDU to use sockets on the added PDU to simulate additional sockets on the UPS, performing a handshaking task with the added PDU, receiving information from the added PDU during performing of the handshaking task, displaying the received information of the added PDU on the web-based user interface and allowing either operating the UPS or controlling the added PDU.

The other objective of the invention is to provide a UPS applying the above-mentioned method that includes multiple sockets, a controller and at least one network interface. Each socket is provided for electrically connecting to either one electrically-powered apparatus or one PDU. The controller is electrically connected with the sockets and provides a web-based user interface. The web-based user interface has a virtual socket setting page and a display and control page. The virtual socket setting page is provided for adding an identification of at least one PDU to use sockets on the added PDU to simulate additional sockets on the UPS. The display and control page is provided for either operating the UPS or controlling the added PDU. The at least one network interface is electrically connected to the controller.

Other objects, advantages and novel features of the invention will become more apparent from the following detailed description when taken in conjunction with the accompanying drawings.

DETAILED DESCRIPTION OF PREFERRED EMBODIMENT

Figure 1:
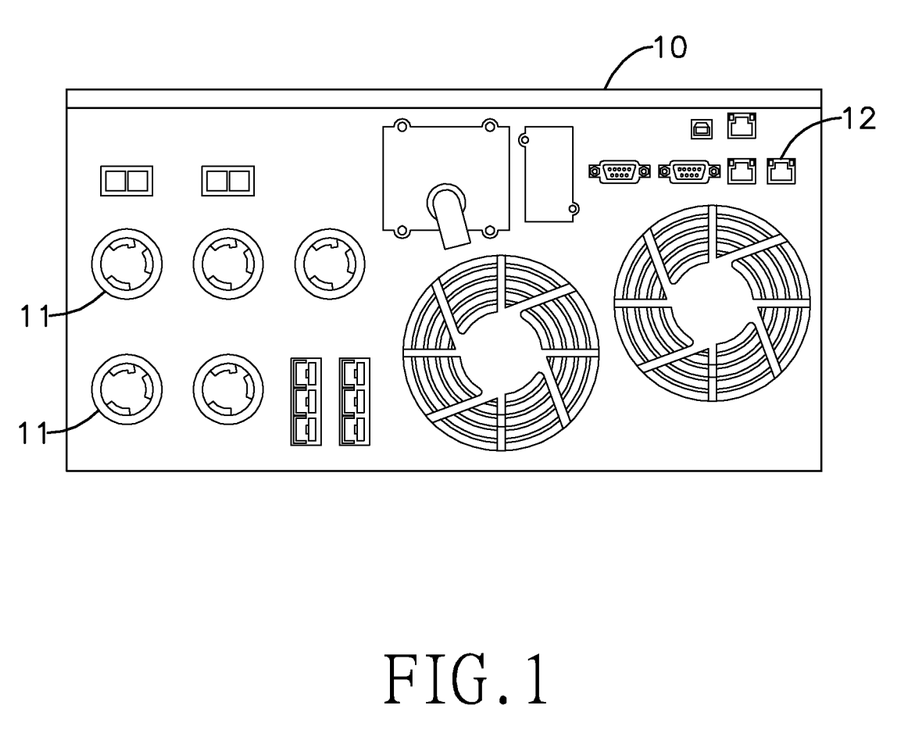
FIG. 1 is a rear view of an uninterruptible power supply (UPS) in accordance with the present invention.

With reference to FIG. 1, an uninterruptible power supply (UPS) 10 in accordance with the present invention comprises multiple sockets 11, at least one network interface 12 and a controller. Each of the multiple sockets 11 is used to electrically connect to one electrically-powered apparatus or one power distribution unit (PDU). The PDU has multiple sockets and at least one network interface. The controller is mounted in the UPS 10 and is electrically connected to the sockets 11 for controlling each socket 11 switching on or off. The at least one network interface 12 is electrically connected to the controller and is for connecting to the Internet. The at least one network interface 12 can be implemented in standard wired or wireless protocols such as LAN (Local Area Network) or WLAN (Wireless Local Area Network), or other wired or wireless protocols such as WI-FI protocol or ZigBee protocol. Further, the controller and the at least one network interface 12 may be integrated into a network management card.

Figure 2:
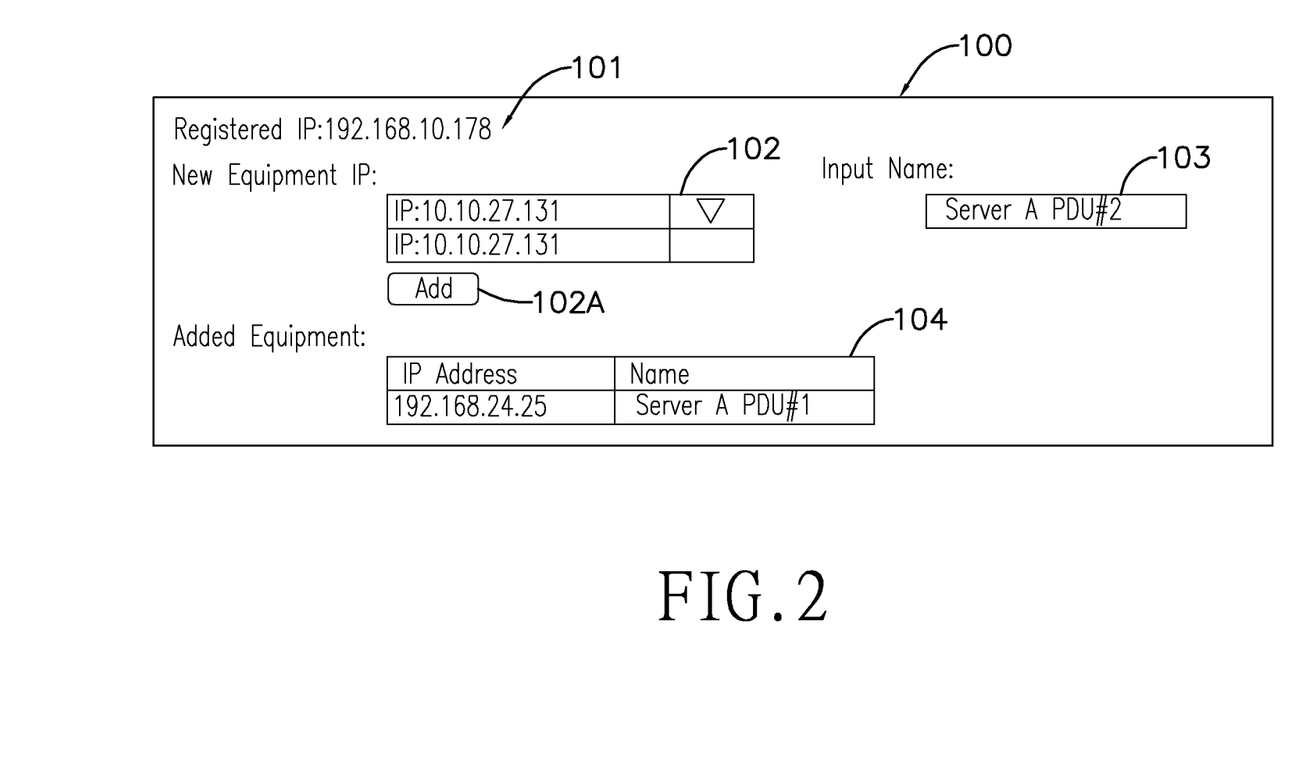
FIG. 2 shows a virtual socket setting page of a web-based user interface provided by a controller in the UPS in accordance with the present invention.
Figure 3:
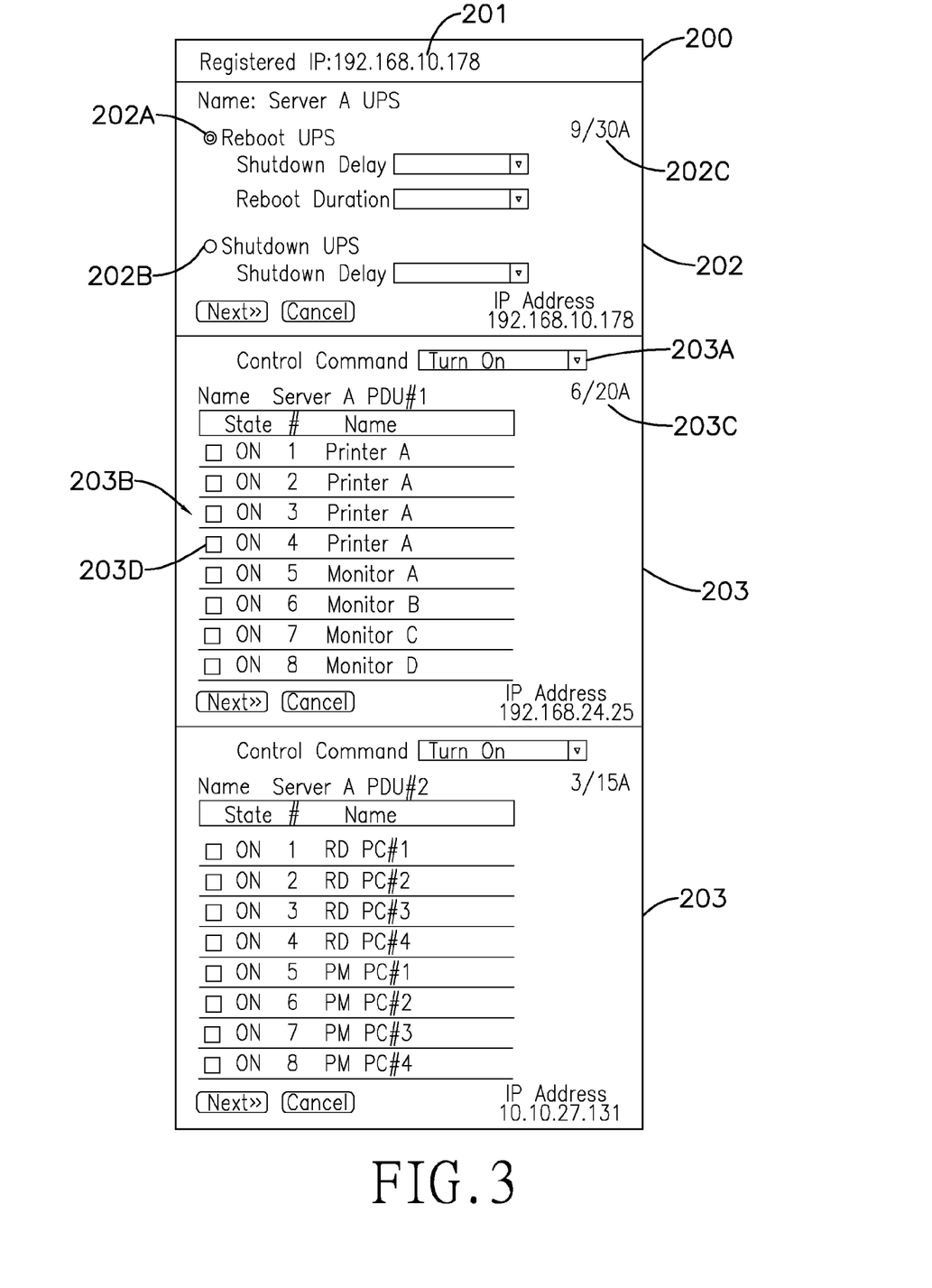
FIG. 3 is a display and control page of the web-based user interface provided by the controller in the UPS in accordance with the present invention.

The controller also provides a web-based user interface. At least one computer can connect to the UPS 10 via the network to browse the web-based user interface. The user interface has a virtual socket setting page 100 and a display and control page 200 to execute a set function.

With reference to FIG. 2, the virtual socket setting page 100 has a first registered IP display field 101, a new equipment input field 102, a name input field 103 and an added equipment display field 104.

The first registered IP display field 101 is provided for displaying an IP address of the UPS 10.

The new equipment input field 102 has an add key 102A. The new equipment input field 102 is provided for adding an identification of a new PDU to use sockets on the added PDU to simulate additional sockets on the UPS 10. The identification of the PDU can be an IP address, a MAC (Media Access Control) address or a series number thereof. In one embodiment, the identification of the PDU is the IP address thereof, such as 10.10.27.131. The name input field 103 is provided for inputting a name of the newly added PDU. After the user can input an IP address of a new PDU into the new equipment input field 102 and a name of the new PDU into the name input field 103, the user presses the add key 102A and subsequently the newly added PDU will be shown in the virtual socket setting page 100. In the meantime, the UPS 10 will perform a handshaking task between the UPS 10 and the newly added PDU via network. After finishing the handshaking task by receiving an acknowledgement from the newly added PDU, the UPS 10 uses the sockets on the newly added PDU to simulate additional sockets thereon and displays a list of the added PDU on the added equipment display field 104. In another embodiment, because each PDU has its own MAC address and series numbers for identification, the UPS 10 may automatically search the PDUs after connecting to the network. A result of searching the PDUs will be shown on the new equipment input field 102 so the user is able to add the searched PDUs to the list of the added PDU by inputting names of the searched PDUs and pressing the add key 102A. Preferably, the new equipment input field 102 may be implemented by a drop-down list.

With reference to FIG. 3, the display and control page 200 has a second registered IP display field 201, a host information field 202 and at least one virtual socket field 203.

The second registered IP display field 201 is provided for displaying an IP address of the UPS 10. The host information field 202 is provided for displaying various information of the UPS 10, displaying loading status information 202C and providing multiple control functions for controlling the UPS 10. The loading status information 202C is provided for displaying a rated current and a working current of the UPS 10. For example, "9/30 A" means the rated current is 30 ampere and the working current is 9 A. The control functions may comprise a reboot function 202A, a shutdown function 202B and the like. The reboot function 202A has a shutdown delay duration option and a reboot duration option. Each option is implemented by a drop-down list to provide multiple parameters such as "immediately", "after 10 seconds" and the like for the user to choose. The shutdown function 202B has a shutdown delay duration option that may be implemented by a drop-down to provide multiple parameters for the user to choose.

Each virtual socket field 203 corresponds to one added PDU and is provided for displaying connection statuses of the sockets on a corresponding PDU. The at least one virtual socket field 203 is also provided for the user to control the sockets of the corresponding PDU. Each virtual socket may display loading status information 203C and include a control command option 203A, a socket information menu 203B and the like.

The loading status information 203C is provided for displaying a rated current and a working current of each PDU. Conventional UPS and PDU have breakers installed therein to protect the UPS and PDU from damage caused by overload. When the working current exceeds the rated current of the UPS 10 or the PDU, the breaker immediately interrupts the circuit therein to stop providing power to the connected equipments. The loading status information 202C, 203C helps the user to monitor the working current of the UPS 10 and each PDU.

The control command option 203A may be implemented by a drop-down list to provide multiple parameters such as "turn on," "turn off" and "reboot" for the user to choose to issue a control command to the corresponding PDU to control the sockets on the corresponding PDU.

When the sockets of a corresponding PDU are selected to simulate additional sockets on the UPS 10 and displayed on the socket information menu 203B, the UPS 10 receives information, such as a state, socket numbers, and the names of equipments connected to the sockets of the corresponding PDU, sent from the corresponding PDU during performing of the handshaking task. Therefore, the socket information menu 203B displays information of each socket of each PDU, such as the state (ON/OFF), socket numbers (1-8) and the names of equipments connected to the sockets (such as printers A to D, monitors A to D).

The socket information menu 203B also has multiple checkboxes 203D, and the sockets of the corresponding PDU correspond respectively to the checkboxes 203D for the user to make selections from the sockets of the corresponding PDU. The selected sockets will be controlled based on a control command selected from the control command option 203A. For example, when the user changes a state of one of the sockets on the corresponding PDU by operating the socket in the socket information menu 203B of the display and control page 200, a control command will be sent from the UPS 10 to the corresponding PDU so the corresponding power distribution unit operates according to the control command to change a state of the selected socket.

Figure 4:
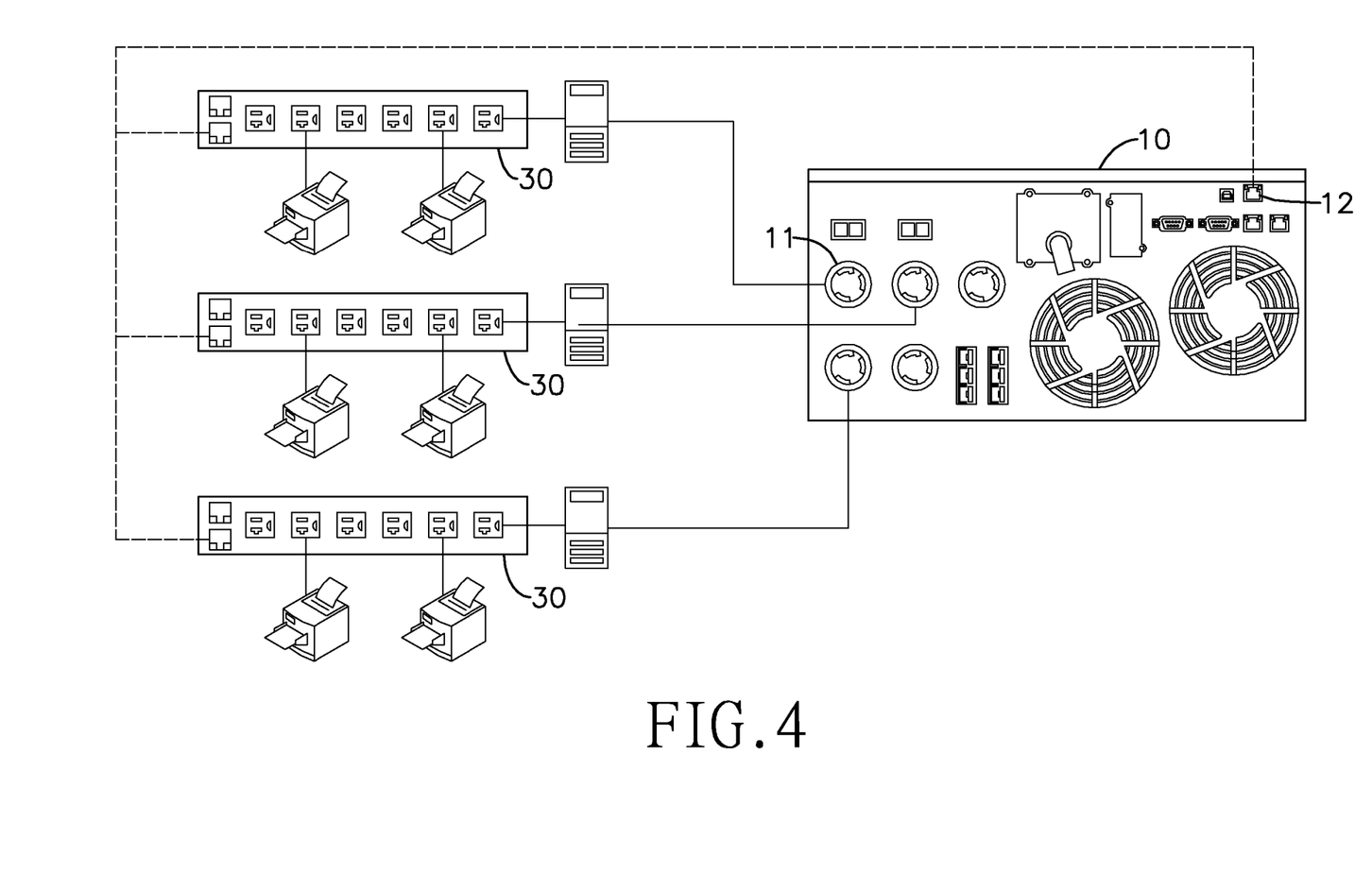
FIG. 4 is a functional block diagram showing that the UPS in accordance with the present invention connects to multiple power distribution units (PDUs)
Figure 5:
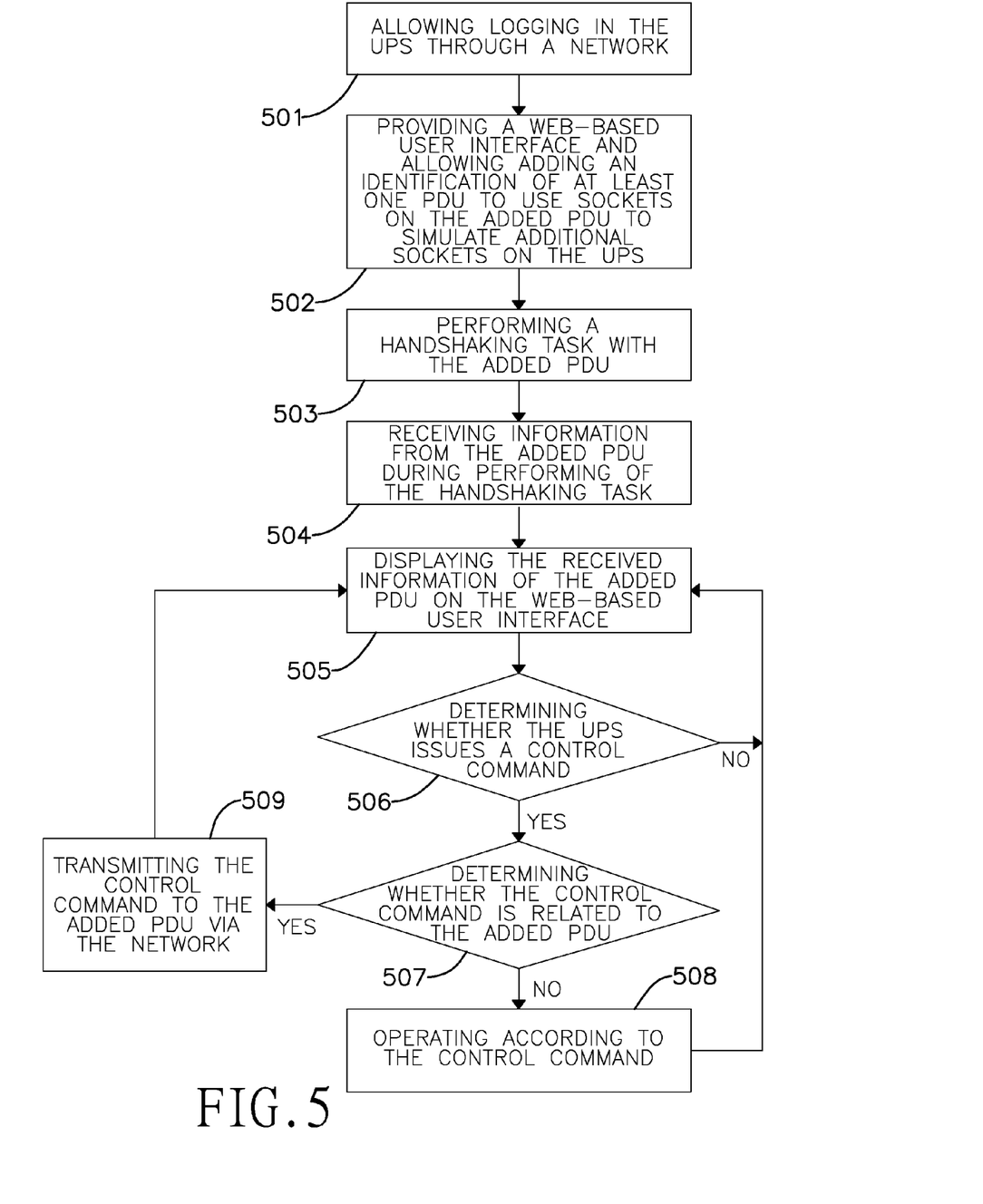
FIG. 5 is a flow chart of a method for controlling PDU by the UPS in accordance with the present invention.

With reference to FIG. 4, the UPS 10 in accordance with the present invention connects to at least one PDU 30 through the network. Each PDU 30 receives power from the UPS 10 and transmits the received power to the sockets thereof. With further reference to FIG. 5, a method for controlling PDU by the UPS in accordance with the present invention comprises that the UPS 10 executes the steps of:

allowing logging in the UPS through a network (501);

providing a web-based user interface and allowing adding an identification of at least one PDU to use sockets on the added PDU to simulate additional sockets on the UPS (502);

performing a handshaking task with the added PDU (503);

receiving information from the added PDU during performing of the handshaking task (504);

displaying the received information of the added PDU on the web-based user interface (505);

determining whether the UPS 10 issues a control command (506);

determining whether the control command is related to the added PDU (507) when receiving the control command;

operating according to the control command (508) if the control command is not related to the added PDU 30; and transmitting the control command to the added PDU via the network (509) if the control command is related to the added PDU 30 so the added PDU 30 operates according to the control command.

The advantages of the present invention are as follows.

1. Because the UPS 10 of the present invention is capable of communicating with all connected PDUs 30, the user can merely login the UPS 10 of the present invention to control and manage all PDUs 30 connected to the UPS 10.

2. A conventional managing server with expensive network manage station software is not necessary because the UPS 10 of the present invention can communicate with all connected PDUs 30 without the conventional managing server. Therefore, the cost on managing and controlling the UPS and PDUs could be reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for controlling power distribution unit (PDU) by an uninterruptible power supply (UPS) comprising steps of:
    allowing logging in the UPS through a network;
    providing a web-based user interface and allowing adding an identification of at least one PDU to use sockets on the added PDU to simulate additional sockets on the UPS;
    performing a handshaking task with the added PDU;
    receiving information from the added PDU during performing of the handshaking task;
    displaying the received information of the added PDU on the web-based user interface; and
    allowing either operating the UPS or controlling the added PDU.

2. The method as claimed in claim 1, wherein the step of allowing either operating the UPS or controlling the added PDU further comprises sub-acts of:
    determining whether the UPS issues a control command;
    determining whether the control command is related to the added PDU when receiving the control command;
    operating according to the control command by the UPS if the control command is not related to the added PDU;
    transmitting the control command to the added PDU via the network if the control command is related to the added PDU so the added PDU operates according to the control command.

3. A UPS applying the method as claimed in claim 1 comprising:
    multiple sockets, and each socket provided for electrically connecting to either one electrically-powered apparatus or one PDU;
    a controller electrically connected to the sockets and providing a web-based user interface, and the web-based user interface having
        a virtual socket setting page provided for adding an identification of at least one PDU to use sockets on the added PDU to simulate additional sockets on the UPS; and
        a display and control page provided for either operating the UPS or controlling the added PDU; and
    at least one network interface electrically connected to the controller.

4. The UPS as claimed in claim 3, wherein the virtual socket setting page comprises:
    a first registered IP display field provided for displaying an IP address of the UPS;
    a new equipment input field provided for adding an identification of a new PDU to use sockets on the added PDU to simulate additional sockets on the UPS; and
    a name input field provided for adding a name of the newly added PDU.

5. The UPS as claimed in claim 4, wherein the display and control page comprises:
    a second registered IP display field provided for displaying an IP address of the UPS;
    a host information field provided for displaying various information of the UPS and providing multiple control functions for controlling the UPS; and
    at least one virtual socket field corresponding to one added PDU and provided for displaying connection statuses of the sockets on a corresponding PDU and provided for a user to control the sockets of the corresponding PDU.

6. The UPS as claimed in claim 5, wherein the at least one virtual socket field comprises:
    a control command option provided for the user to choose to issue a control command to the corresponding PDU to control the sockets on the corresponding PDU; and
    a socket information menu displaying the received information of each socket of each power distribution unit and having multiple checkboxes, and the checkboxes corresponding respectively to the sockets of the corresponding PDU and provided for the user to make selection from the sockets of the corresponding PDU so the selected sockets are controlled based on the control command.

7. The UPS as claimed in claim 4, wherein the host information field and the virtual socket field display loading status information provided for displaying a rated current and a working current of the UPS and the added PDU.

8. The UPS as claimed in claim 5, wherein the new equipment input field is implemented by a drop-down list.

9. The UPS as claimed in claim 3, wherein the identification is chosen from an IP address, a media access control address or series number of a PDU.

10. The UPS as claimed in claim 3, wherein the network interface is chosen from being implemented in a wired protocol or a wireless protocol.

11. A UPS applying the method as claimed in claim 2 comprising:
    multiple sockets, and each socket provided for electrically connecting to either one electrically-powered apparatus or one PDU;
    a controller electrically connected to the sockets and providing a web-based user interface, and the web-based user interface having a virtual socket setting page provided for adding an identification of at least one PDU to use sockets on the added PDU to simulate additional sockets on the UPS; and a display and control page provided for either operating the UPS or controlling the added PDU; and at least one network interface electrically connected to the controller.

12. The UPS as claimed in claim 11, wherein the virtual socket setting page comprises:

a first registered IP display field provided for displaying an IP address of the UPS;

a new equipment input field provided for adding an identification of a new PDU to use sockets on the added PDU to simulate additional sockets on the UPS; and a name input field provided for adding a name of the newly added PDU.

13. The UPS as claimed in claim 12, wherein the display and control page comprises:

a second registered IP display field provided for displaying an IP address of the UPS;

a host information field provided for displaying various information of the UPS and providing multiple control functions for controlling the UPS; and at least one virtual socket field corresponding to one added PDU and provided for displaying connection statuses of the sockets on a corresponding PDU and provided for a user to control the sockets of the corresponding PDU.

14. The UPS as claimed in claim 13, wherein the at least one virtual socket field comprises:

a control command option provided for the user to choose to issue a control command to the corresponding PDU to control the sockets on the corresponding PDU; and a socket information menu displaying the received information of each socket of each power distribution unit and having multiple checkboxes, and the checkboxes corresponding respectively to the sockets of the corresponding PDU and provided for the user to make selection from the sockets of the corresponding PDU so the selected sockets are controlled based on the control command.

15. The UPS as claimed in claim 12, wherein the host information field and the virtual socket field display loading status information provided for displaying a rated current and a working current of the UPS and the added PDU.

16. The UPS as claimed in claim 13, wherein the new equipment input field is implemented by a drop-down list.

17. The UPS as claimed in claim 11, wherein the identification is chosen from an IP address, a media access control address or series number of a PDU.

18. The UPS as claimed in claim 11, wherein the network interface is chosen from being implemented in a wired protocol or a wireless protocol.

* * * * *